United States Patent
Eckelman et al.

(10) Patent No.: US 8,190,988 B2
(45) Date of Patent: May 29, 2012

(54) FORM BUNDLING

(75) Inventors: Hans Micah Eckelman, Lakewood, CO (US); Douglas Leon Birch, Littleton, CO (US)

(73) Assignee: Efficient Forms, LLC, Littleton, CO (US)

( * ) Notice: Subject to any disclaimer, the term of this patent is extended or adjusted under 35 U.S.C. 154(b) by 1171 days.

(21) Appl. No.: 11/855,313

(22) Filed: Sep. 14, 2007

(65) Prior Publication Data

US 2008/0072133 A1      Mar. 20, 2008

Related U.S. Application Data

(60) Provisional application No. 60/825,818, filed on Sep. 15, 2006.

(51) Int. Cl.
*G06F 17/00* (2006.01)

(52) U.S. Cl. ........ 715/223; 715/221; 715/222; 715/224; 715/226

(58) Field of Classification Search .................. 715/226, 715/223

See application file for complete search history.

(56) References Cited

U.S. PATENT DOCUMENTS

| | | | |
|---|---|---|---|
| 5,237,680 A * | 8/1993 | Adams et al. | 1/1 |
| 5,745,712 A * | 4/1998 | Turpin et al. | 715/763 |
| 5,778,395 A * | 7/1998 | Whiting et al. | 1/1 |
| 6,247,029 B1 | 6/2001 | Kelley et al. | |
| 6,345,278 B1 | 2/2002 | Hitchcock et al. | |
| 6,460,042 B1 | 10/2002 | Hitchcock et al. | |
| 6,757,674 B2 | 6/2004 | Wiens et al. | |
| 7,318,066 B2 * | 1/2008 | Kaufman et al. | 1/1 |
| 7,334,187 B1 * | 2/2008 | Stanciu et al. | 715/222 |
| 7,363,312 B2 * | 4/2008 | Goldsack | 1/1 |
| 7,376,891 B2 | 5/2008 | Hitchcock et al. | |
| 7,734,995 B1 * | 6/2010 | Saikaly | 715/200 |
| 2003/0237046 A1 * | 12/2003 | Parker et al. | 715/513 |
| 2004/0111727 A1 * | 6/2004 | Schwarzbauer et al. | 719/310 |

OTHER PUBLICATIONS

Ronnau et al, "Efficient and Reliable Merging of XML Documents", ACM, 2009, pp. 2105-2106.*
Tancred Lindholm, "A Three-way Merge for XML Documents", ACM, 2004, pp. 1-10.*

* cited by examiner

*Primary Examiner* — Laurie Ries
*Assistant Examiner* — Zaida Marrero
(74) *Attorney, Agent, or Firm* — HolzerIPLaw, PC

(57) ABSTRACT

A form management system is provided that bundles individual electronic form instances into a single bundled form. Form field names in the electronic form instances and scripts are renamed at the time the form instances are merged into a bundle. In this manner, common names can be assigned to individual form fields in individual forms and then only the form field names in electronic forms selected for the bundle are renamed. Furthermore, the same renaming scheme is also executed in the scripts associated with the individual form documents and fields. As such, the form field names in the scripts of bundled documents are altered to reference the renamed form fields in the corresponding component forms.

20 Claims, 8 Drawing Sheets

Fig. 5

```
JAVASCRIPT EDITOR                                                    [X]
┌─CREATE AND EDIT JAVASCRIPTS ─────────────────────────────────────────┐
│ //<AcroForm>                         ╭─702                           │
│ //<ACRO_source>01150_name~4:calculate</ACRO_source>                  │
│ //<acro_script>                                                      │
│ /********** belongs to: AcroForm:011500_name~4:calculate **********/ │
│ if[getField("004000_appt_type~4").isBoxChecked(1)]                   │
│         event.value = this.getField{"003000_name~4"}.value/          │
│ //</ACRO_script>                                                     │
│ //</AcroForm>                                                        │
│                                                                      │
│ //<AcroForm>                                                         │
│ //<ACRO_source>027000_middle_initial:calculate</ACRO_source>         │
│ //<acro_script>                                                      │
│ /********** belongs to: AcroForm:027000_middle_initial:calculate **********/ │
│ if[getField("027000_middle_initial").value != 0]                     │
│         event.value = (getField("027000_middle_initial").value) .charAt(0) │
│ //</ACRO_script>                                                     │
│ //</AcroForm>                                                        │
│                                                                      │
│ //<AcroForm>                                                         │
│ //<ACRO_source>DoB_DNM:Calculate</ACRO_source>                       │
│ //<acro_script>                                                      │
│ /********** belongs to: AcroForm:DoB_DNM:calculate **********/       │
│ if(getField("028000_DoB_month").value !=" ")                         │
│         event.value = getField("028000_Dob_month").value) + "/" + getField("028000_dob_day").value + "/" + │
│ getField("028000_dob_year").value;                                   │
│ else                                                                 │
│         event.value = " ";                                           │
│ //</ACRO_script>                                                     │
│ //</AcroForm>                                                        │
│                                                                      │
│ //<AcroForm>                                                         │
│ //<ACRO_source>FULL_NAME_DNM~3:Calculate</ACRO_source>               │
│ //<acro_script>                                                      │
│ /********** belongs to: AcroForm:FULL_NAME_DNM~3:calculate **********/ │
│ event.value = getField("027000_name_first~3").value + " " + getField("027000_name_middle~3").value + " " + │
│ getField("027000_name_first~3").value;                               │
│                                                                      │
│                                                                      │
│ //</ACRO_script>                                                     │
│ //</AcroForm>                                                        │
│                                                                      │
│ //<AcroForm>                                                         │
│ //<ACRO_source>FULL_NAME_DNM~5:Calculate</ACRO_source>               │
│ //<acro_script>                                                      │
│ /********** belongs to: AcroForm:FULL_NAME_DNM~5:calculate **********/ │
│ event.value = getField("027000_name_first~5").value + " " + getField("027000_name_middle~5").value + " " + │
│ getField("027000_name_first~5").value;                               │
│ //</ACRO_script>                                                     │
└──────────────────────────────────────────────────────────────────────┘
                                                         LN 9, COL 2783

[ OK ]  [ CANCEL ]  [ GOTO... ]

FORM BUNDLING

CROSS-REFERENCE TO RELATED APPLICATIONS

This application claims benefit of U.S. Provisional Patent Application No. 60/825,818, entitled "Form Bundling" and filed on Sep. 15, 2006, which is incorporated by reference herein for all that it discloses and teaches.

BACKGROUND

In a common electronic form application scenario, an administrator may select among hundreds of forms that have been populated by an applicant (e.g., through an electronic interview process or through manual input) and submit these selected forms for processing by another party, such as an insurance carrier, a prospective employer, a government agency, a general contractor, etc. The administrator may, for example, select one set of forms to be submitted to a first party and bundle it into a single electronic document for submission to the first party. The administrator may then select a different set of forms to be submitted to a second party, also bundling this set into a single electronic document for submission.

Each form typically includes named form fields, which store the data provided by the applicant. Many forms also have program or script code that executes in association with each form. For example, a script might execute to copy non-standard input into a standard format (e.g., "Oak St." to "Oak Street"). Scripts typically reference one or more named form fields in the electronic document on which to operate.

In a system involving many different forms, it is common that different electronic form documents include form field names that are identical. For example, applicant name fields are named with common names across different forms (e.g., "Applicant_Last_Name", "Applicant_First_Name"). However, in some environments, a bundling or merge operation does not accommodate the merger of two forms having identical form field names. Instead, during a merge operation, the first encountered form field having a shared name is overwritten by a subsequently encountered form field of the same name. As such, the data associated with the first encountered form field is lost.

Unfortunately, avoiding such overwriting by merely building the individual forms to include all unique form field names throughout a large number of forms presents a terrible management problem—similar but unique scripts for different forms would need to be customized for each form, unique form field names would need to be tracked across all forms, and different instances of the same form in the same bundle (e.g., one form for a primary applicant and the other form for the primary applicant's spouse) would still present the problem of common form field names in the bundle.

SUMMARY

The above referenced problems and others are solved by dynamically renaming form field names in form instances and scripts when the form instances are merged into a bundle. In this manner, common names can be assigned to individual form fields in individual forms and then only the form field names in electronic forms selected for the bundle are renamed. Furthermore, the same renaming scheme is also executed in the scripts associated with the individual form documents and fields. As such, the form field names in the scripts of bundled documents are altered to reference the renamed form fields in the corresponding component forms.

The foregoing aspects and many of the attendant advantages of the described technology will become more readily appreciated as the same become better understood by reference to the following detailed description, when taken in conjunction with the accompanying drawings.

BRIEF DESCRIPTION OF THE DRAWINGS

FIG. 5 depicts a screenshot of an example form and its unaltered form fields.

FIG. 7 depicts a screenshot of example scripts from a form and its altered form field references.

DETAILED DESCRIPTION

A form management system described herein provides business users (e.g., non-programmers) with a tool to develop product solutions in an ASP (web-based) format to be implemented across industries, although other solutions may also apply. For example, a web-based interview process can collect data from an applicant and populate a database. The database can then be used to populate multiple forms (e.g., an insurance application for a husband, an insurance application for a wife, and an insurance application for a child). Using such a form management system and with no prior understanding of databases, data structures, or output formats (e.g., PDF, XML, etc.), business users can build easy-to-use products to collect critical business transaction information and deliver this data to fielded forms.

Any given business transaction may involve a multitude of forms or sets of forms for completion. Preparing and collecting the required forms and placing them into proper order and format for efficient processing typically require a burdensome amount of manual effort. The form management system automates various portions of this process and automatically resolves problems with merging forms with similar form fields.

An example form bundling feature of a form management system examines the two (or more) electronic form documents before the merge process begins and renames the form field names into unique names based on the each individual form's order in the bundled document. The form bundling feature also parses the document or field scripts (e.g., JavaScript) to find the renamed form fields and alters these form field names in the script according to the new naming convention. In one implementation, each form instance may include one or both document-specific scripts (e.g., on a per-form-instance basis) and form-form-field-specific scripts (e.g., on a per-form-field basis). In such an implementation, form field references in both types of scripts may be renamed. Once all the form fields are renamed and all the scripts are altered to reference the renamed fields, the documents can be safely merged without destroying form fields or the data in the form fields.

Figure 1:
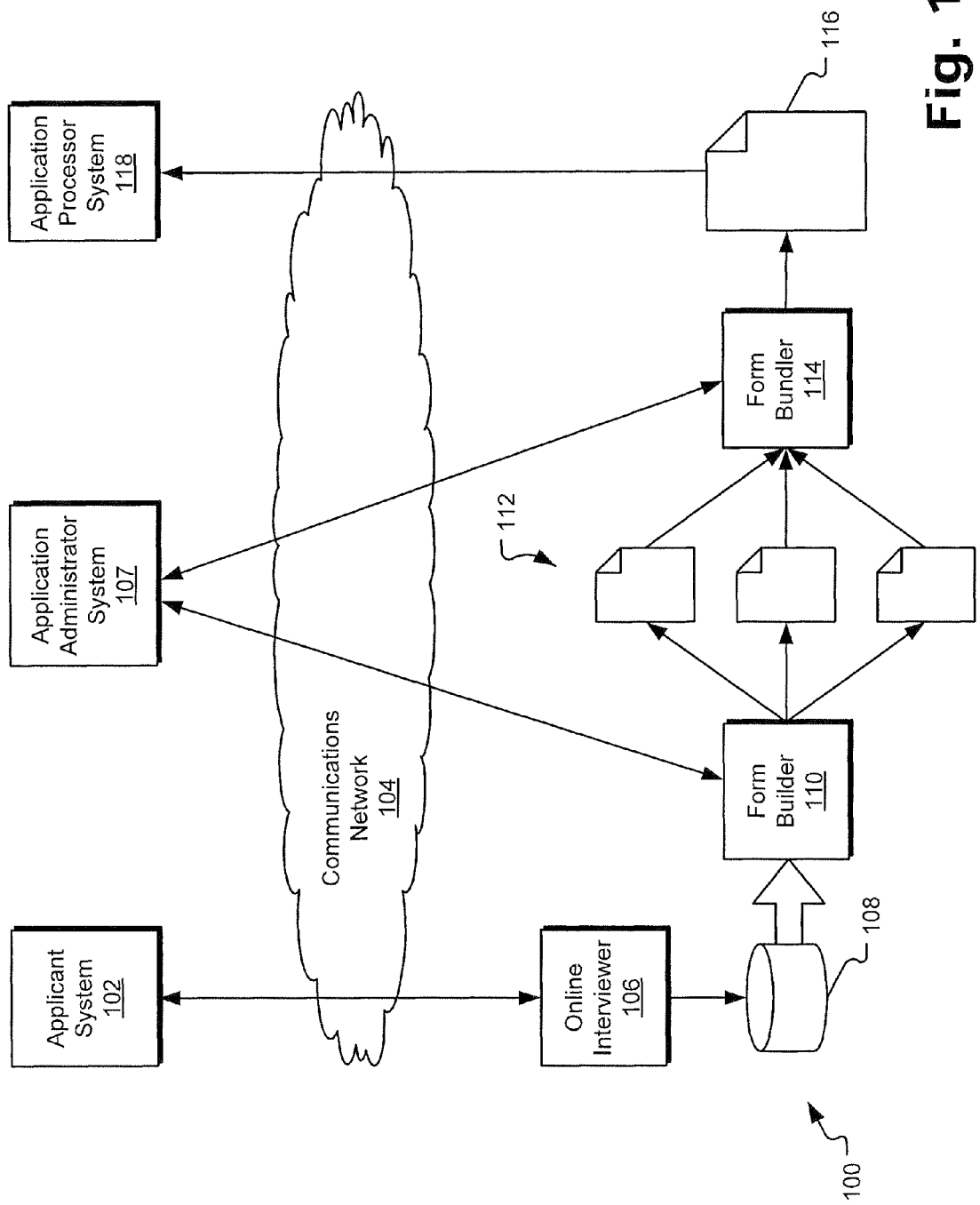
FIG. 1 depicts an example system for creating bundled electronic forms.

FIG. 1 depicts an example system 100 for creating bundled electronic forms in a form management system. An applicant client system 102 can be used to access (through a communications network 104) an online interviewer module 106, which can execute on a server executing a form management system, on a separate server, or on the applicant client system 102. In one implementation, the online interviewer module 106 prompts an applicant with a series of questions designed to collect data that will be used to populate one or more forms maintained by the form management system.

For example, the applicant may be applying for health insurance. As such, the online interviewer module 106 prompts the applicant for information about his/her identity and address, family members, health history, doctors, etc. Such information is recorded in a database 108 for use in populating forms with the provided information.

At any time, although typically after the applicant has provided the requisite information, an application administrator can access the form management system through an application administrator system 107 to build the forms required to complete the application process. In one implementation, the application administrator accesses a form builder module 108 to extract the individual instances of forms needed for the application process and to populate such form instances.

Which instances are actually needed for a particular application or application process may vary and may be selected in a variety of ways (e.g., based on information provided by the applicant, based on information provided by the application processor, or based on selections provided by the application administrator). For example, if the applicant indicates that they have a minor living at home, the form builder module 110 may ask questions about that minor individual and then select a form in which the responses to those questions are to be populated. In an alternative implementation, selection of individual instances of forms falls to the application administrator, who may be familiar with the application process. In yet another implementation, the application processor specifies which instances of forms are required for its application process. Such implementations may be combined in any fashion.

A set of form instances 112 are output from the form builder module 110. The set can include instances of different form types (e.g., an application form and an authorization form) and/or different instances of the same form type (e.g., two different application forms, one for a primary insured and another for a secondary insured). Typically, each form instance is populated with information from the database 108, although some form instances in the set can also include data from other sources (e.g., from the application administrator) and other form instances in the set may not include any populated information (e.g., the form instance can merely be a static disclosure form with no populated data).

The set of form instances 112 are input to a form builder module 114, which alters one or more of the form instances and merges them into a single electronic form document 116. The bundled form document 116 can then be submitted electronically (or printed and then submitted in hard-copy) to an application processor system 118.

Figure 2:
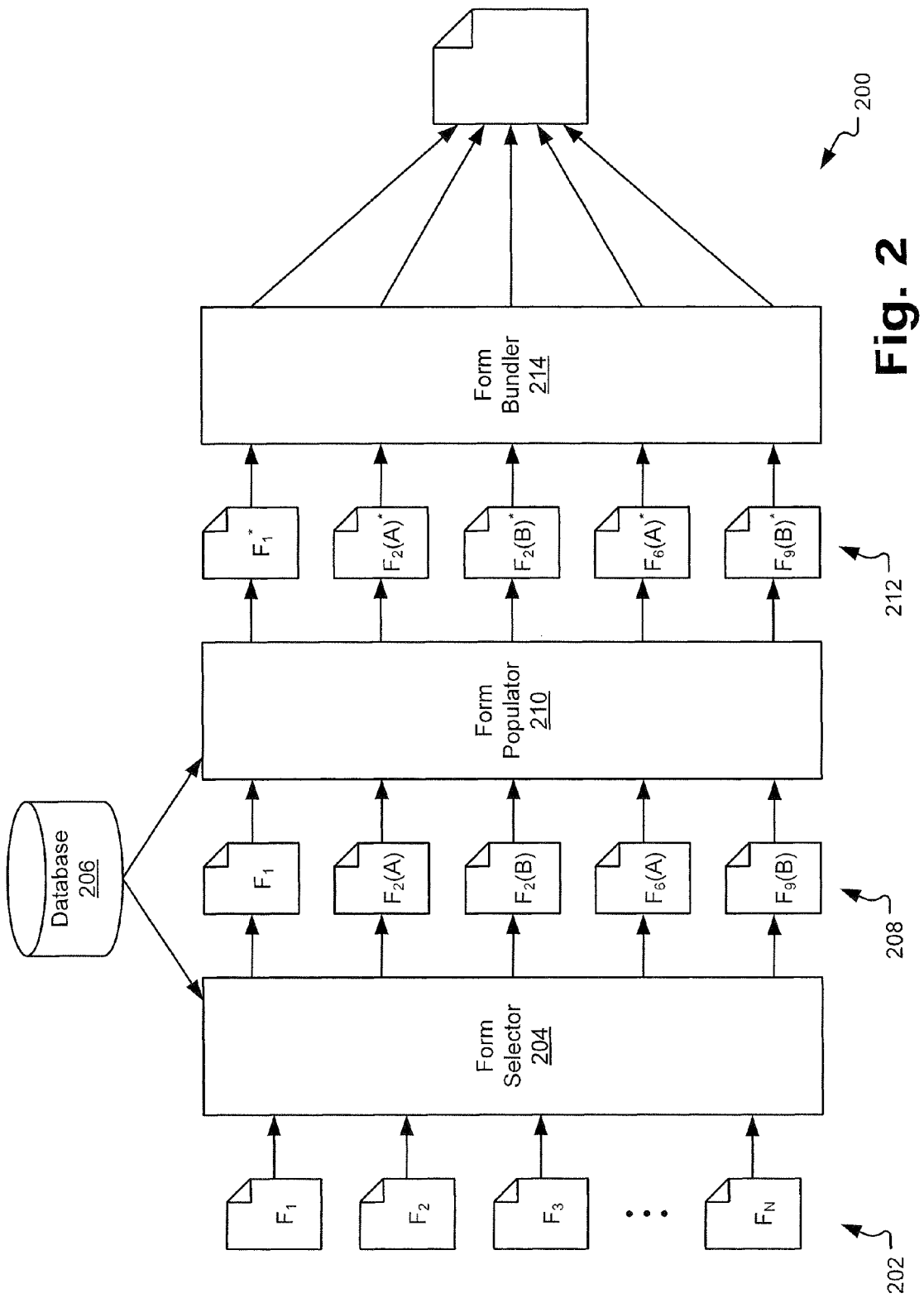
FIG. 2 depicts an example system for selecting, populating and bundling electronic forms.

FIG. 2 depicts an example system 200 for selecting, populating and bundling electronic forms in a form management system. A set of forms 202 (labeled $F_1$-$F_N$) are available to the form management system, where N represents the number of forms available to the system. A form selector module 204 selects a subset of the forms 202 for use with an individual application (or other bundle). Each selected form is represented as a form instance 208 in FIG. 2. As discussed, the selection may be informed by a variety of sources, including applicant information in a database 206, pre-selections specified by the application processor, selections provided by the application administrator, etc.). In the illustrated example in FIG. 2, the form selector module 204 selects the set for form instances 208, including a form instance $F_1$, two instances of the $F_2$ (e.g., one pertaining to individual A and the other pertaining to individual B), a form instance $F_6$ pertaining to individual A, and a form instance $F_9$ pertaining to individual B.

A form populator module 210 extracts information from the database 206 and populates the forms to generate populated form instances 212 (designated by the asterisks). In one implementation, the database 206 includes a mapping between the applicant data and each form field of the form instances 208. Accordingly, the form populator module 210 extracts data values (e.g., strings, numerical values, etc.) from the database 206 and copies the data values to the corresponding form fields of each form instance 208.

A form bundler module 214 processes the populated form instances 212 to rename the contained form field names and script references to unique form field names and then merges the populated forms instances (with the renamed field names and references) to generate a bundled form 214. In one implementation, the form bundler module 214 steps through each form instance, identifying form field names in each form instance and renaming each form field name with a unique name (among all of the form instances 212). For example, in one implementation, all of the form fields are renamed to include a suffix "~X", where X represents a number designated to the form instance. The form bundling module 214 also finds each form field name reference in the scripts contained in each form instance and modifies the reference to match the corresponding renamed form field. By renaming the form field references in the scripts, the scripts are altered to execute properly on the renamed form fields in each form. In an alternative implementation, the form bundler module 214 only renames form field names that are shared across the selected set of form instances, as well as the related form field references in the scripts. As a result of the bundling, the form field names and form field references in form-embedded scripts of the individual form instances have been processed to ensure that each form field and each reference to that form field in a script is unique across the entire bundle.

Figure 3:
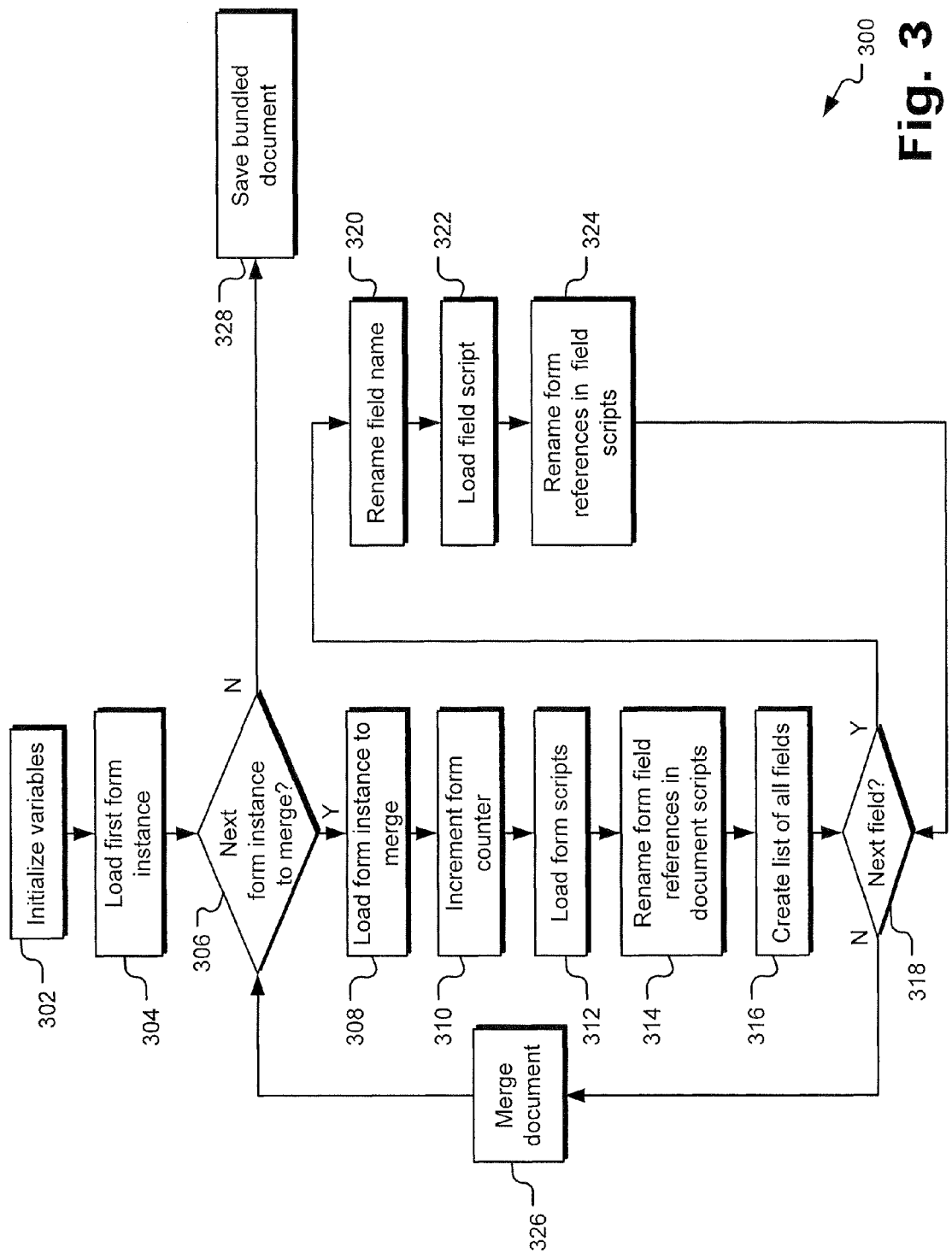
FIG. 3 illustrates example operations for bundling an electronic form.

FIG. 3 illustrates example operations 300 for bundling an electronic form. An initialization operation 302 initializes the data structures and variables used in the bundling process. A loading operation 304 loads the first selected form instance into a form bundler module. However, no renaming is required for the first form instance, as its form fields are assumed to be unique. (Nevertheless, in an alternative implementation, the form fields and form field references in the scripts of this first form instance may be renamed anyway.) A decision operation 306 determines whether there is another form instance to merge, which is likely in the first execution through this process loop. If there is another form instance, a loading operation 308 loads the form instance. A counter operation 310 increments a form counter (e.g., in one implementation, the first form instance loaded in the loading operation 308 is associated with a form counter value of "1").

Another loading operation 312 loads the document-specific script from the current form instance. A renaming operation 314 (see FIG. 4) renames the form field references in the document-specific script of the current form instance. A listing operation 316 generates a list of all form fields in the current form. An example of a form instance having non-renamed form fields is shown in a screenshot 500 illustrated in FIG. 5.

Figure 6:
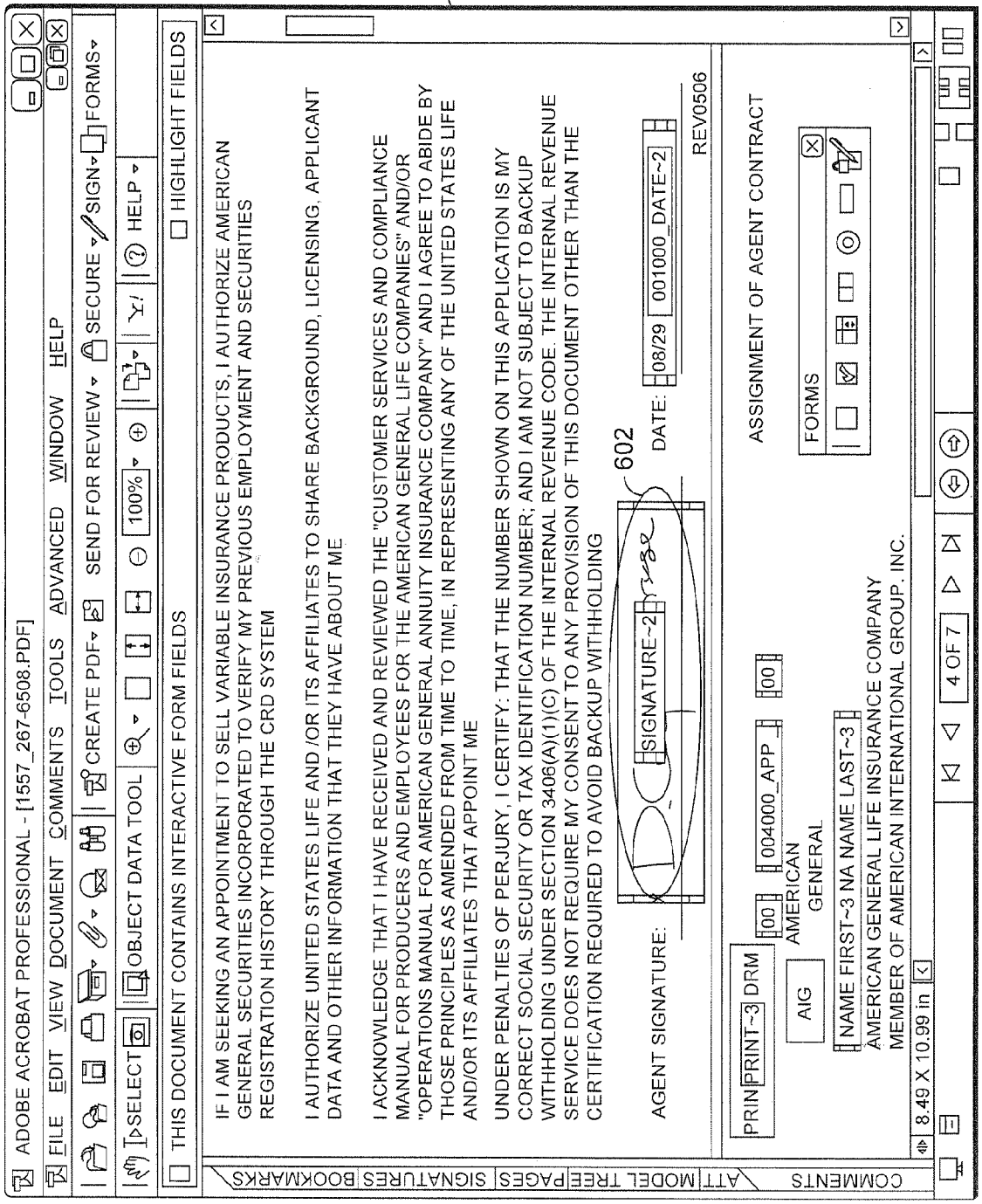
FIG. 6 depicts a screenshot of an example form and its altered form fields.

A decision operation 318 traverse through each form field in the list, looping through operations 320, 322, and 324 if a next form field exists in the list. The renaming operation 320 renames the form field to be unique within the bundled document. In one implementation, the renaming operation 320 appends a tilde and the current form counter value to the current form field name. For example, a form field name of "Last_Name" in the first form instance to be merged would be renamed "Last_Name~1", although other renaming schemes are also contemplated. An example of a form instance depicting renamed form fields is shown in a screenshot 600 illustrated in FIG. 6. Notice that form field 502 in the screenshot 500 of FIG. 5 has a form field named "signature" and a form field 602 in the screenshot 600 of FIG. 6 has been renamed as "signature~2".

Another loading operation 322 loads a field script for the current form field (if such a script exists). Another renaming operation 324 (see FIG. 4) renames the form field references in the field script of the current form field. Processing then proceeds to the decision operation 318 to traverse to the next form field in the list, if one exists.

If no additional form field is left in the list, then a merge operation 326 merges the current form into the original form instance, which was opened in the opening operation 302. Then processing traverses to the next form to bundle, as determined by the decision operation 306. If no additional forms are found, the final bundled document with (typically) multiple form pages and uniquely renamed form fields and form field references in scripts is saved to a new file.

Figure 4:
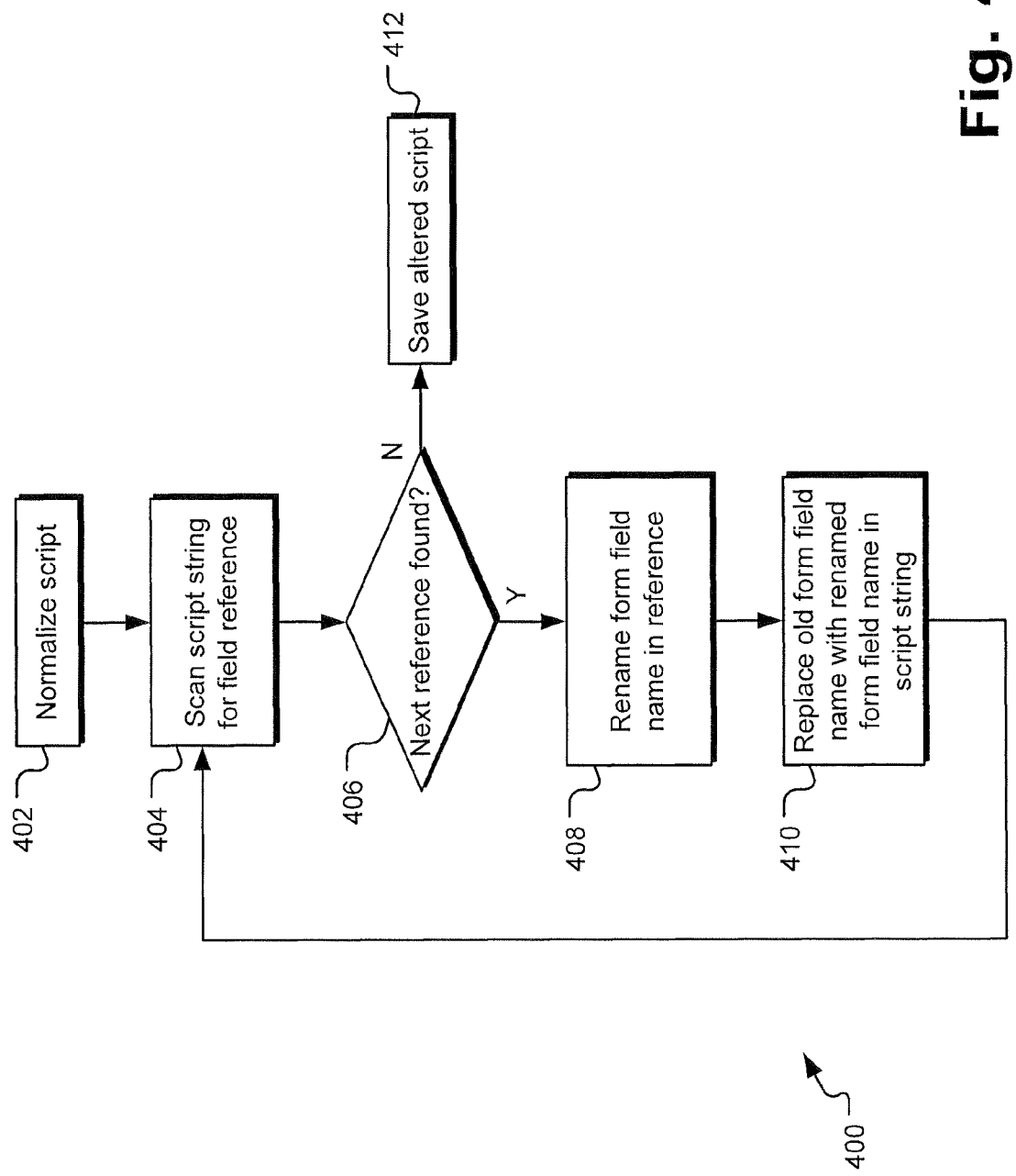
FIG. 4 illustrates example operations for renaming form field references in scripts of a form instance destined for a bundled electronic form.

FIG. 4 illustrates example operations for renaming form field references in scripts of a form instance destined for a bundled electronic form. A normalization operation 402 removes extraneous characters, such as extra carriage returns, line feeds, and spaces, from the script string. A scanning operation 404 scans the script string for form field references. If a form field reference is found, as determined by a decision operation 406, the form field reference is copied and altered to reflect a unique form field name in a renaming operation 408. For example, a form field reference of "Last_Name" in the first merged form might be renamed "Last_Name~1", although other renaming schemes are also contemplated. The old form field reference in the script string is then replaced by the newly renamed form field reference in a replacement operation 410. Processing then loops to the scanning operation 404 to search for the form field reference in the script string. If no form field reference is found, as determined by the decision operation 412, then the altered script string is saved in the form, replacing the original script string.

An example of a script depicting renamed form field references is shown in a screenshot 700 illustrated in FIG. 7 (see renamed form field reference 702). Note specifically, that the second line is shown as follows:

//<ACRO_source>011500_name~4:Calculate</ACRO_source> wherein the renamed form field name is "name~4", which corresponds to a field name in the fourth page of the bundled document. The number 011500 is an artifact of a numbering scheme used to link a specific form field to a corresponding field in the online interview that collects form information (i.e., the number pertains to the mapping between the applicant data and each form field of the form instances).

Figure 8:
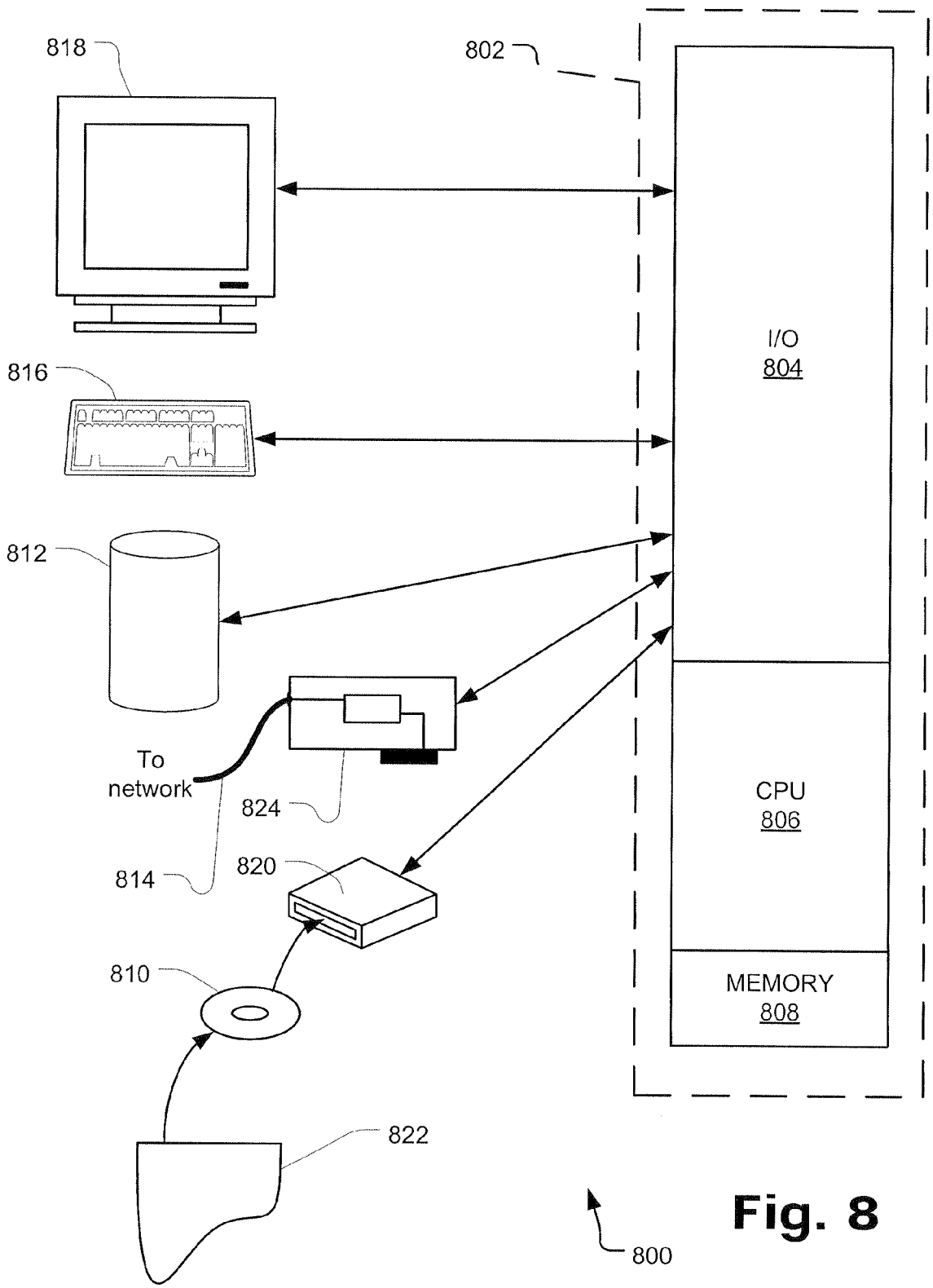
FIG. 8 illustrates an example computing system that can be used to implement the described technology.

FIG. 8 illustrates an example computing system that can be used to implement the described technology. A general purpose computer system 800 is capable of executing a computer program product to execute a computer process. Data and program files may be input to the computer system 800, which reads the files and executes the programs therein. Some of the elements of a general purpose computer system 800 are shown in FIG. 8 wherein a processor 802 is shown having an input/output (I/O) section 804, a Central Processing Unit (CPU) 806, and a memory section 808. There may be one or more processors 802, such that the processor 802 of the computer system 800 comprises a single central-processing unit 806, or a plurality of processing units, commonly referred to as a parallel processing environment. The computer system 800 may be a conventional computer, a distributed computer, or any other type of computer. The described technology is optionally implemented in software devices loaded in memory 808, stored on a configured DVD/CD-ROM 810 or storage unit 812, and/or communicated via a wired or wireless network link 814 on a carrier signal, thereby transforming the computer system 800 in FIG. 8 to a special purpose machine for implementing the described operations.

The I/O section 804 is connected to one or more user-interface devices (e.g., a keyboard 816 and a display unit 818), a disk storage unit 812, and a disk drive unit 820. Generally, in contemporary systems, the disk drive unit 820 is a DVD/CD-ROM drive unit capable of reading the DVD/CD-ROM medium 810, which typically contains programs and data 822. Computer program products containing mechanisms to effectuate the systems and methods in accordance with the described technology may reside in the memory section 804, on a disk storage unit 812, or on the DVD/CD-ROM medium 810 of such a system 800. Alternatively, a disk drive unit 820 may be replaced or supplemented by a floppy drive unit, a tape drive unit, or other storage medium drive unit. The network adapter 824 is capable of connecting the computer system to a network via the network link 814, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based or other operating system. It should be understood that computing systems may also embody devices such as Personal Digital Assistants (PDAs), mobile phones, gaming consoles, set top boxes, etc.

When used in a LAN-networking environment, the computer system 800 is connected (by wired connection or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are exemplary and other means of and communications devices for establishing a communications link between the computers may be used.

In an exemplary implementation, an online interviewer module, a form builder module, a form bundling module, a form selection module and other modules may be incorporated as part of the operating system, application programs, or other program modules. Form templates, forms, form instances, and other data may be stored as program data in memory 808 or other storage systems, such as disk storage unit 812 or DVD/CD-ROM medium 810.

The above specification, examples and data provide a complete description of the structure and use of exemplary implementations of the described articles of manufacture and methods. Since many implementations can be made without departing from the spirit and scope of the invention, the invention resides in the claims hereinafter appended.

In some implementations, articles of manufacture are provided as computer program products. One implementation of a computer program product provides a computer program storage medium readable by a computer system and encoding a computer program. Another implementation of a computer program may be provided in a computer data signal embodied in a carrier wave by a computing system and encoding the computer program.

Furthermore, certain operations in the methods described above must naturally precede others for the described method to function as described. However, the described methods are not limited to the order of operations described if such order sequence does not alter the functionality of the method. That is, it is recognized that some operations may be performed before or after other operations without departing from the scope and spirit of the claims.

What is claimed is:

1. A method comprising:
receiving a selection of electronic form instances to be merged into a bundled electronic form instance, each electronic form instance including at least one named form field and at least one script referencing the at least one named form field;
renaming at least one named form field in at least one of the electronic form instances of the selection to be unique across the selection of electronic form instances;
renaming one or more references to the named form field in the at least one script in the at least one of the electronic form instances of the selection to match the renamed form field;
merging the selection of electronic form instances into the bundled electronic form instance.

2. The method of claim 1 wherein the operation of renaming at least one named form field comprises:
renaming all named form fields in at least one of the electronic form instances of the selection to be unique across the selection of electronic form instances.

3. The method of claim 2 wherein the operation of renaming one or more references to the named form field comprises:
renaming all references to the named form fields in the at least one script in the at least one of the electronic form instances of the selection to match the renamed form field.

4. The method of claim 1 wherein the operation of renaming at least one named form field comprises:
renaming all named form fields in all of the electronic form instances of the selection to be unique across the selection of electronic form instances.

5. The method of claim 4 wherein the operation of renaming one or more references to the named form field comprises:
renaming all references to the named form fields in the at least one script in all of the electronic form instances of the selection to match the renamed form fields.

6. The method of claim 1 wherein the operation of renaming at least one named form field comprises:
identifying one or more named form fields that are not unique across the selection of electronic form instances;
renaming the identified non-unique named form fields resident in any of the selected electronic form instances to be unique across the selection of electronic form instances.

7. The method of claim 6 wherein the operation of renaming one or more references to the named form field comprises:
renaming all references to the identified non-unique named form fields in the at least one script in the at least one of the electronic form instances of the selection to match the renamed form fields.

8. The method of claim 1 wherein the operation of renaming one or more references to the named form field comprises:
renaming all references to the named form fields in a document-specific script and in a form-field-specific script of the at least one of the electronic form instances of the selection to match the renamed form fields.

9. A method comprising:
receiving a selection of electronic form instances to be merged into a bundled electronic form instance, each electronic form instance including at least one named form field and at least one script referencing the at least one named form field;
renaming all of the named form fields in all of the electronic form instances of the selection to be unique across the selection of electronic form instances;
renaming all of the references to the named form fields in all document-specific scripts and all form-field-specific scripts in the electronic form instances of the selection to match the renamed form fields;
merging the selection of electronic form instances into the bundled electronic form instance.

10. The method of claim 9 wherein the operation of renaming all of the named form field comprises renaming all of the named form field instances using an count value attributed to each corresponding electronic form instance.

11. A computer-readable storage medium encoding a computer program for executing a computer process on a computer system, the computer process comprising:
receiving a selection of electronic form instances to be merged into a bundled electronic form instance, each electronic form instance including at least one named form field and at least one script referencing the at least one named form field;
renaming at least one named form field in at least one of the electronic form instances of the selection to be unique across the selection of electronic form instances;
renaming one or more references to the named form field in the at least one script in the at least one of the electronic form instances of the selection to match the renamed form field;
merging the selection of electronic form instances into the bundled electronic form instance, responsive to the renaming operations.

12. The computer-readable storage medium of claim 11 wherein the operation of renaming at least one named form field comprises:
renaming all named form fields in at least one of the electronic form instances of the selection to be unique across the selection of electronic form instances.

13. The computer-readable storage medium of claim 12 wherein the operation of renaming one or more references to the named form field comprises:
renaming all references to the named form fields in the at least one script in the at least one of the electronic form instances of the selection to match the renamed form field.

14. The computer-readable storage medium of claim 11 wherein the operation of renaming at least one named form field comprises:

renaming all named form fields in all of the electronic form instances of the selection to be unique across the selection of electronic form instances.

15. The computer-readable storage medium of claim 14 wherein the operation of renaming one or more references to the named form field comprises:

renaming all references to the named form fields in all of the electronic form instances of the selection to match the renamed form fields.

16. The computer-readable storage medium of claim 11 wherein the operation of renaming at least one named form field comprises:

identifying one or more named form fields that are not unique across the selection of electronic form instances;

renaming the identified non-unique named form fields resident in any of the selected electronic form instances to be unique across the selection of electronic form instances.

17. The computer-readable storage medium of claim 16 wherein the operation of renaming one or more references to the named form field comprises:

renaming all references to the identified non-unique named form fields in the at least one script in the at least one of the electronic form instances of the selection to match the renamed form fields.

18. The computer-readable storage medium of claim 11 wherein the at least one script includes a document-specific script.

19. The computer-readable storage medium of claim 11 wherein the at least one script includes a form-field-specific script.

20. The computer-readable storage medium of claim 11 wherein the operation of renaming one or more references to the named form field comprises:

renaming all references to the named form fields in a document-specific script and in a form-field-specific script of the at least one of the electronic form instances of the selection to match the renamed form fields.

* * * * *